May 10, 1932.  G. E. STRANDT  1,857,746

WHEEL STRUCTURE

Filed May 10, 1928  6 Sheets-Sheet 1

Fig.1.

INVENTOR.
Gustav E. Strandt
BY
Erwin, Wheeler & Woolard
ATTORNEYS.

May 10, 1932. G. E. STRANDT 1,857,746

WHEEL STRUCTURE

Filed May 10. 1928  6 Sheets-Sheet 6

INVENTOR.
Gustav E. Strandt.
BY Erwin, Wheeler & Woolard
ATTORNEYS.

Patented May 10, 1932

1,857,746

UNITED STATES PATENT OFFICE

GUSTAV E. STRANDT, OF MILWAUKEE, WISCONSIN

WHEEL STRUCTURE

Application filed May 10, 1928. Serial No. 276,562.

My invention relates to improvements in wheel structures, including pulleys and drums, but more especially to vehicle wheels.

The primary object of this invention is to provide a wheel with an internal brake which will be adequately protected from gritty material, ice, and other material which would otherwise interfere with the durability of the brake or with its effectiveness in operation.

Further objects are to provide an improved brake peculiarly adapted for use as an internal wheel or pulley brake; to provide improved mechanism for operating a brake; to provide satisfactory means for mounting such mechanism within a wheel or pulley and actuating it from an external source such as a lever or other actuating member; to provide a wheel structure which will facilitate access to the brake mechanisms for adjustment or repair; to provide means for applying the brake and brake mechanisms to the driving and steering wheels of motor driven vehicles; and in general to provide improved means for braking wheels and pulleys with greater efficiency, uniformity of braking effect, and durability, than has heretofore been attained.

In the drawings.

Like parts are identified by the same reference characters throughout the several views.

Referring to Figures 1, 2, 3 and 4 which show the general organization of a driving or tractor wheel equipped with the invention, it will be observed that the driving axle 10 is enclosed within a supporting axle housing 11 in the ordinary manner. The driving axle is provided at its outer end with a fixed collar 12 having radially projecting arms 13. This collar with its associating arms constitutes a driving spider interlocked with an associated hub 14 which is welded or otherwise rigidly secured to a cap 15, which is secured by bolts 16 to the outer wall 17 of that portion of the wheel which serves as a housing for the brake mechanism. The opposing wall 18 of this housing is connected by bolts or rivets 19 to the member 17 and has its inner margin connected by bolts or rivets 20 with the wheel hub 21. The housing members 17 and 18 have outer portions parallel and in contacting relation where they are connected by the rivets 19. Intermediate portions extend divergently inwardly from the contacting portions, preferably at an angle of about 45° from the central plane of the wheel, and the inner surfaces of these portions constitute seatings for the seating portions 22 of the brake shoes 23. The inner marginal portion of the member 17 is laterally turned at 25 and inwardly turned at 26 in a plane parallel with the central plane of the wheel and the bolts 16 pass through this portion, the ends of the bolts being preferably screwed into or otherwise connected to a reinforcing member 27 whereby the cap member 15 and the housing member 17 may be clamped together by the nuts 28 on the bolts 16. The members 27 are preferably short blocks or buttonlike pieces welded to the portion 26 of the housing or web member 17.

The brake shoes 23 are preferably V-shaped in cross section and their receiving surfaces are formed to fit the divergent walls of the housing members 17 and 18. Each shoe is segmental, three shoes being illustrated in Figure 2 which form nearly a complete circle. Each shoe is provided at its respective ends with inwardly projecting ears or arms 30 suitably apertured to receive coiled tension springs 31 which extend through the apertures of the contiguous ears or arms 30 at the opposing ends of associated brake shoes. The springs have their ends connected to hooks 32 on the respective brake shoes which they connect so that the springs tend to draw the ends of the shoes together, thereby drawing the shoes away from the seating faces of the housing members 17 and 18.

The central portion of each brake shoe is provided with inwardly projecting paired ears 34 between which a lever 35 is mounted and pivoted to the ears by a pivot pin 36. The lever 35 has a short arm pivoted at 37 to a supporting arm 38 which projects radially from a ring 39 which is splined to the outer end of the supporting axle 11, the ring having internal key ribs 40 fitted to corresponding keyways in the supporting axle 11. The ring 39 has a laterally projecting hub or sleeve 41 which provides a bearing for an oscillatory ring 42. A ring nut 43 is screwed to the extremity of the supporting axle 11 and holds both rings 39 and 42 in place. The ring 42 is utilized to actuate the levers 35 and set the brake shoes in the manner now to be described.

Figure 1:
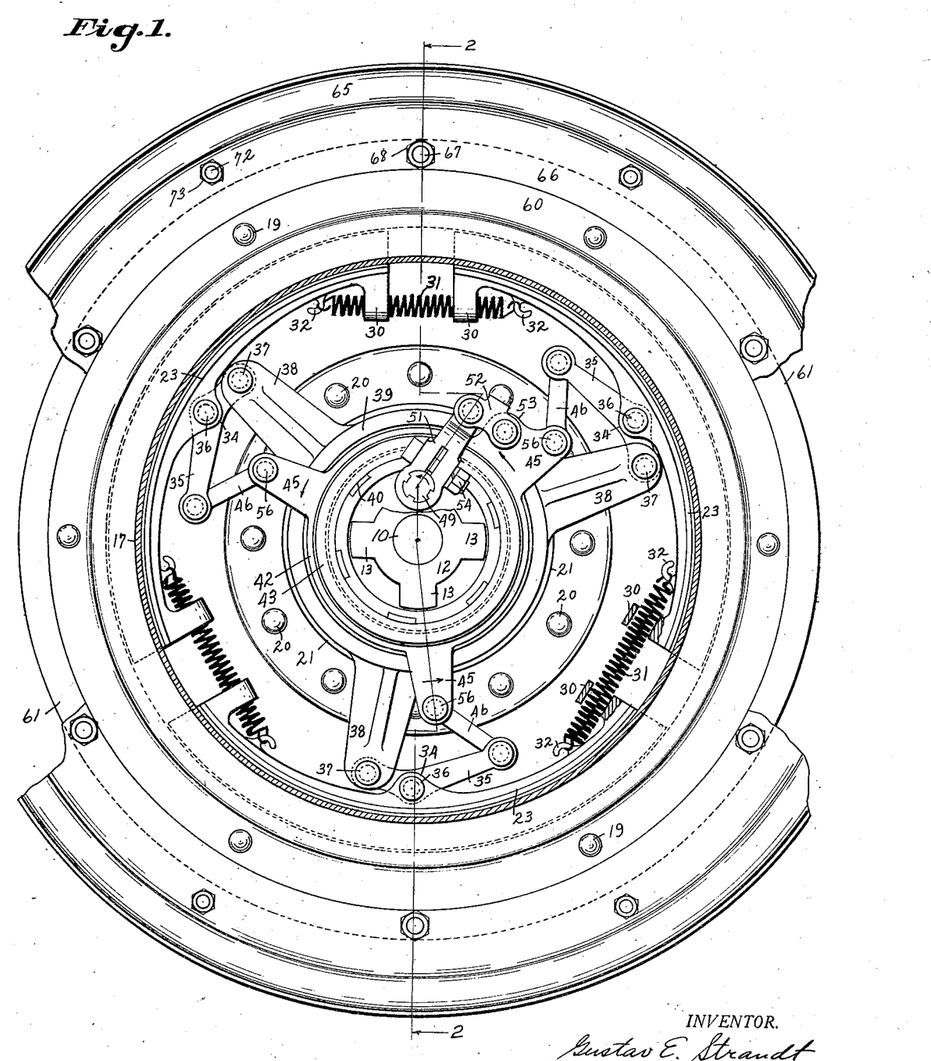
Figure 1 is a side elevation of a motor driven vehicle tractor wheel with its driving cap removed to expose the brake mechanism and with a portion of the brake seat shown in vertical section drawn to a plane indicated by the line A—A in Figure 2.
Figure 2:
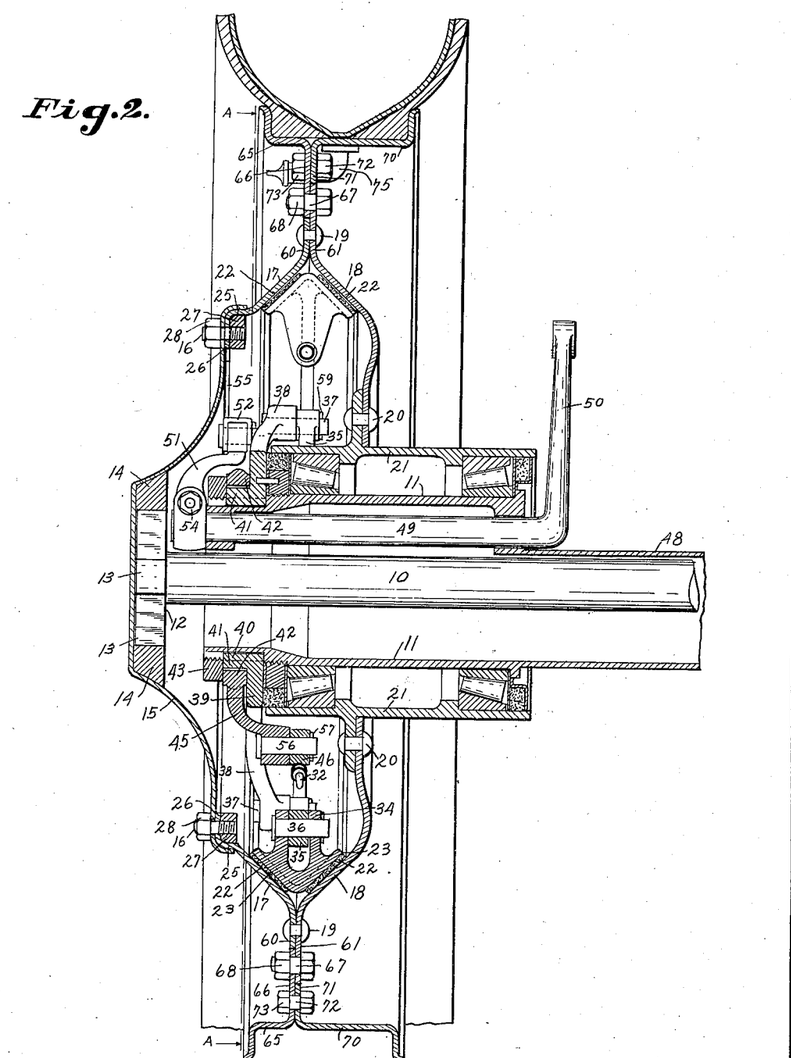
Figure 2 is a sectional view of the same, drawn to line 2—2 of Figure 1.

It will be observed in Figure 2 that the ring 42 is provided with radial arms 45 corresponding in number to the number of arms 38, levers 35 and brake shoes 23. Each of the arms 45 is connected by a link 46 with the long arm of a lever 35 so that, by oscillating the ring 42 in the direction indicated by the arrows associated with the arms 45 in Figure 1, the long arms of the levers 35 will be pushed outwardly by the associated links 46 and move the brakes outwardly, each of the levers being fulcrumed upon a relatively fixed pivot pin 37. The ring 42 is loosely mounted on the bearing sleeve 41, sufficient movement being allowed to permit an equalization of the pressure upon the brake shoes. A convolute split ring 47 is interposed between the sleeve 41 and ring 42 to prevent rattling. The arms 45 and links 46 form a knee toggle whereby the pressure increases as the arms 45 and links 46 swing toward a position of alignment. One link 46' is made in threaded sections to take up wear.

It will be noted that the supporting axle 11 is concentric to the driving axle 10 but is eccentric to the supporting tubular axle bar or housing 48, whereby sufficient space is provided above the driving axle 10 for an oscillatory shaft 49 having an upwardly projecting arm 50 which is adapted to be connected by a rod or wire to an ordinary foot pedal or other brake setting means, these connections not being illustrated for the reason that any ordinary brake operating connections may be employed.

The rock shaft 49 has an arm 51 at its outer end which curves inwardly between the brake setting arms 45 and is connected with one of them by a link 52. The arm 45 to which the connection is made is preferably provided with ears 53 to facilitate connecting the link 52. In the construction shown an oscillation of the ring shaft 49 in the direction indicated by the arrow in Figure 1 will pull the associated arm 45 in the direction indicated by its arrow, i. e. in a counter-clockwise direction, and this motion will of course be transmitted through the ring 42 to the other arms 45, whereby all of the brake shoes will be pushed outwardly in the direction of their seatings on the housing or web members 17 and 18 of the wheel, the shoes being formed for a wedging action or cone clutch action upon the seating faces.

Owing to the fact that the brakes and all of the operating mechanism for transmitting motion from the rock shaft 49 to the brakes are completely housed within the wheel, they may be adequately lubricated and owing to the cone clutch action of the brake upon the seating faces of the wheel lubrication of the brake shoes and seating faces is also possible while still maintaining wholly adequate brake efficiency.

Ordinarily little attention to the housed portion of the brake mechanism will be required inasmuch as the loose ring 42 operates as an equalizer to maintain equal pressure upon all of the shoes within the wheel. However, access can be easily obtained and the parts removed for repair, for replacement of brake shoe linings, or for lubrication in the manner now to be described.

By removing the nuts 28, cap 15 may be removed and withdrawn from the spider of the driving axle 10. Thereupon the clamping nut 54 may be loosened and the brake actuating arm 51 withdrawn from the outer end of the rock shaft 49. This allows the nut 43 to be removed.

Figure 3:
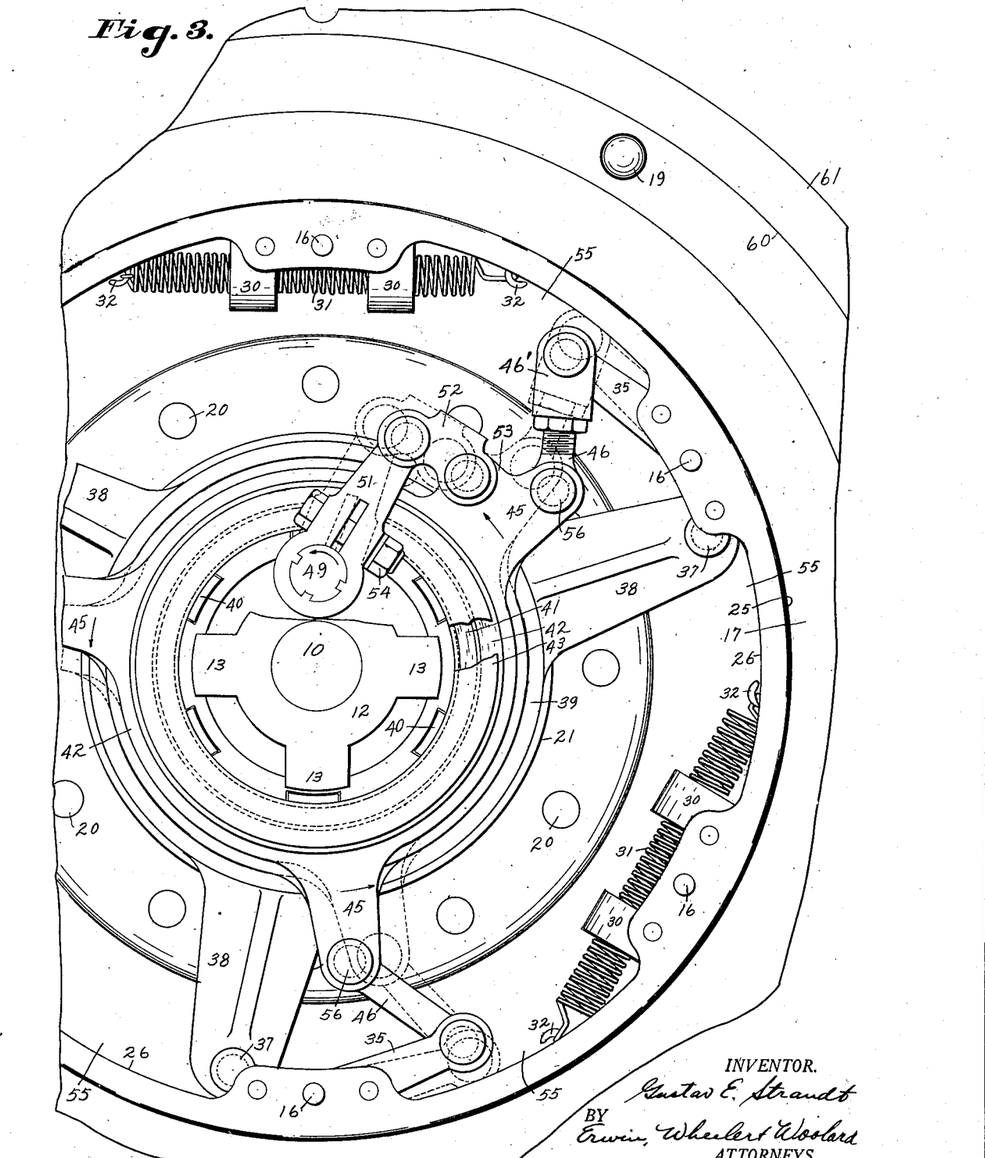
Figure 3 is an enlarged fragmentary elevation showing a portion of the brake mechanism illustrated in Figure 1 with an alternative adjusting link and segmental brake units, with dotted lines illustrating the motion transmitting connections in brake setting position.

The link pins 56 are preferably secured in position by cotter pins 57 which pass through suitable apertures in the inner ends of the pins, the outer ends being headed. By removing the cotter pins 57 the link pins 56 may be withdrawn, whereupon the oscillatory ring 42 with its associated arms 45 may be removed. The pivot pins 37 also have their outer ends headed and their inner ends provided with cotter pins 59, the removal of which allows the withdrawal of these pins 37, thereby releasing the brakes and permitting the withdrawal of the ring 39 with its associated arms 38. The portion 26 of the web or housing member 17 is provided with notches 55 as shown in Figures 2 and 3, through which the ends of the arms 38 may pass when the ring 39 is being withdrawn. The springs 31 will then draw the brake shoes together whereupon these shoes may also be withdrawn either in assembled relation to each other or singly by disconnecting the springs from the respective hooks 32.

The felly or rim portion of the wheel is also novel in construction and this will now be described.

It will be observed in Figure 2 that the parallel contacting or abutting portions 60 and 61 of the housing or web members 17 and 18 are of different widths or degrees of radial extension, the portion 61 being extended radially considerably beyond the outer margin of the portion 60. A rim member 65 has an inwardly extending flange 66, the inner margin of which abuts the outer margin of the portion 60 of the web member 17 and this flange is secured by bolts 67 and clamping nuts 68 to the portion 61 of the web member 18. A co-operating rim member 70 has an inwardly projecting flange 71 which is similarly connected with the flange 66 by bolts 72 and clamping nuts 73.

Figure 4:
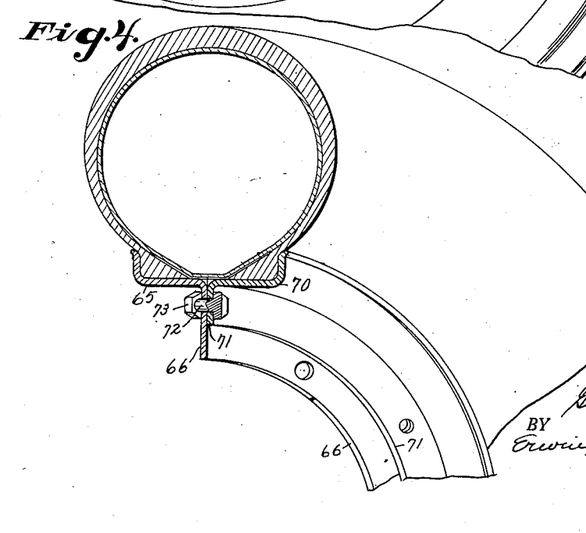
Figure 4 is an enlarged fragmentary view of the rim and tire showing the rim member assembly and tire in radial section.

The rim may be demounted by removing the clamping nuts 68 and the two rim members 65 and 70 may be separated from each other by removing clamping nuts 73 (Figure 4). The tire nipple 75 may be bent and extended through apertures in the flanges 71 and 66 as shown at the top in Figure 2.

Figure 5:
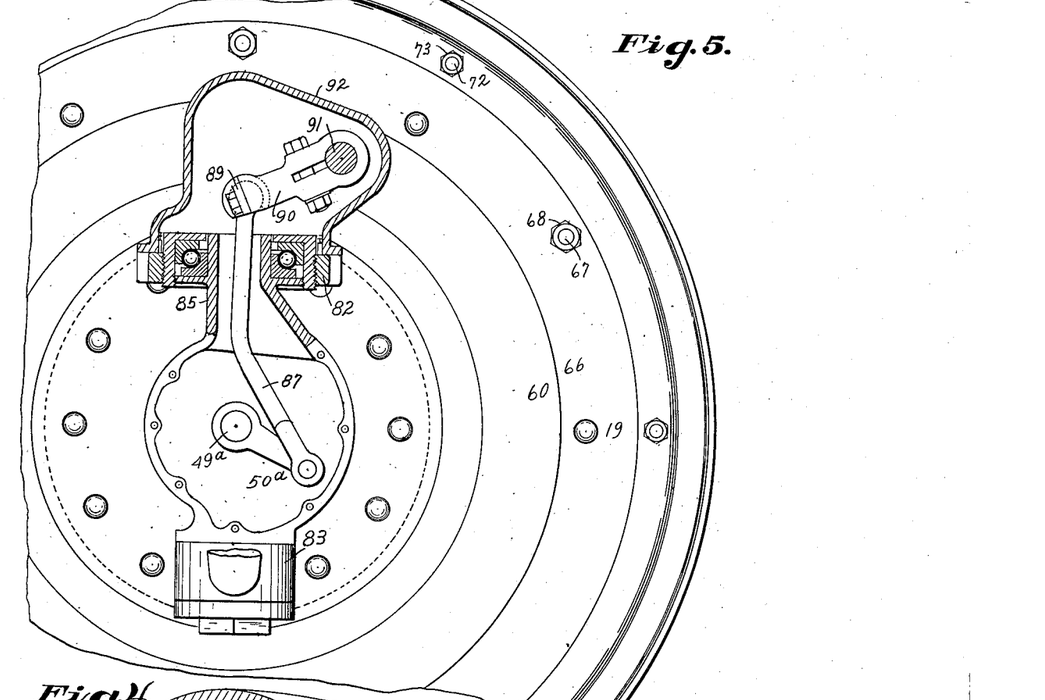
Figure 5 is a fragmentary view of the inner face of one of the steering wheels with parts broken away to show one of the steering pivots in vertical section and the brake operating connections associated therewith.
Figure 6:
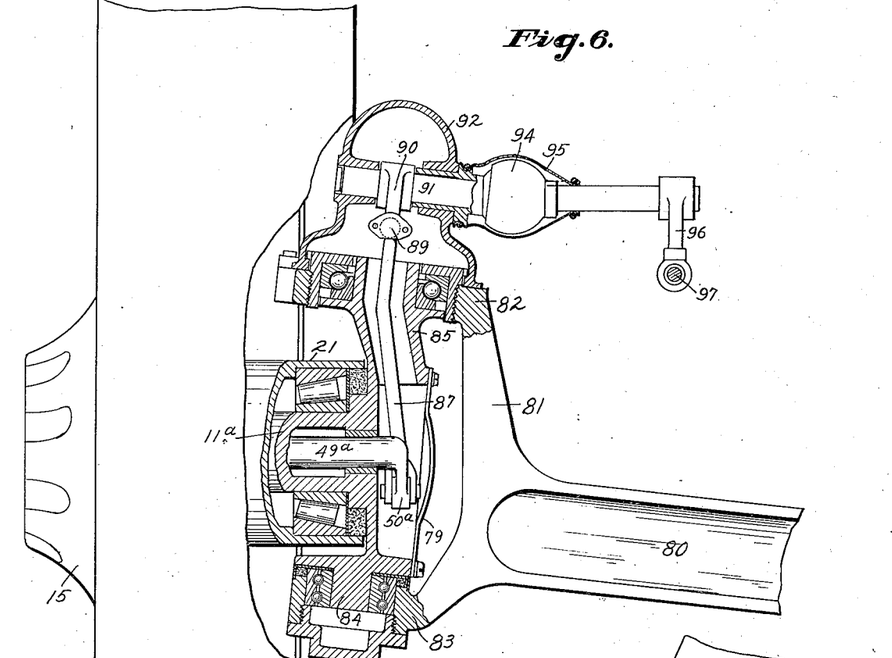
Figure 6 is a fragmentary view, in front elevation, of a steering axle and associated wheel to which my invention has been applied, parts being broken away in vertical section to illustrate the steering pivot members and the means for transmitting motion therethrough for brake setting purposes.

When the invention is to be applied to the steering wheels of the vehicle it is merely necessary to provide special means for transmitting motion to the oscillatory shaft 49a to rock the same for brake setting or releasing operations, and this mechanism will now be described as it is illustrated in Figures 5 and 6.

When the power is not directly applied to the front wheels the shaft 49a may be mounted at the axis of the hub as shown in Figures 5 and 6 and the cap 15 will be merely a cap there being no driving shaft with which to connect it. The inner end of the axle 11a will carry the steering pivot trunnions and will be provided with a dust excluding cap 79.

The supporting axle bar 80, yoke 81 and its associated steering pivot bearings 82 and 83 may be assumed to be of any ordinary construction and this is also true of the lower pivot post or trunnion 84. The upper trunnion 85 is tubular and its inner end is inclined sufficiently to allow a connecting rod 87 to be extended through it for connection to the arm 50a associated with the oscillatory shaft 49a. This connecting rod 87 has universal joint connection at 89, with an arm 90 of an associated rock shaft 91 journalled in the housing member 92 associated with the yoke or fork 81. This rock shaft 91 is universally jointed at 94, the joint being covered by a flexible jacket 95 whereby motion may be transmitted through the flexible joint 94 of the shaft 91 to oscillate the latter. Any suitable means for oscillating the shaft 91 for brake setting purposes may be employed. In Figure 6 I have shown an arm 96 on the outer portion of the shaft 91, this arm 96 being connected with a brake rod 97 which may be associated with the foot pedal (not shown) in an ordinary manner. It may be understood that all portions of the brake mechanism and wheel illustrated in Figures 5 and 6 may be of the construction disclosed in Figures 1, 2, 3, and 4 except as herein described.

Figures 7, 8:
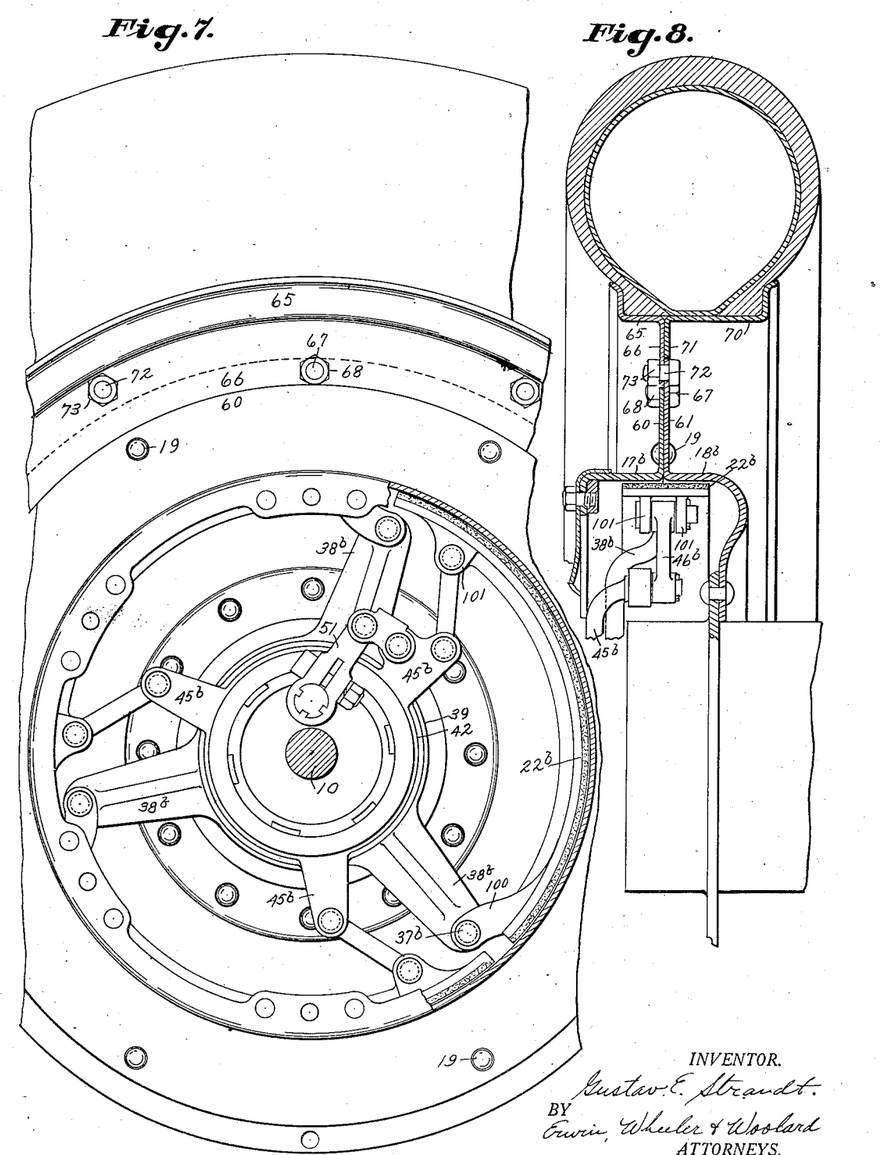
Figure 7 is an outer side elevation showing a modified form of wheel with its hub cap partly broken away.
Figure 8 is a view of a portion of the same, in vertical section.
Figure 9:
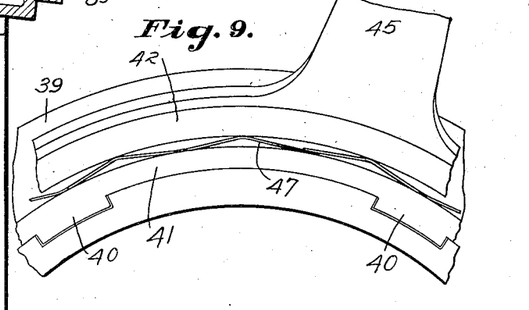
Figure 9 is a detail, showing the resilient mounting of the brake ring.

Referring to the structure shown in Figures 7 and 8 it may be assumed that all the parts are substantially as disclosed in Figures 1, 2 and 3 except those which will now be described. The spider arms 38b are supported from a ring like the ring 39 in Figures 1, 2 and 3 and the arms 45b are associated with an oscillatory ring like the ring 42. The brake shoes 22b each have one end provided with curved ear pieces 100 pivotally connected with the ends of the arms 38b by pivot pins 37b. At the other end of each brake shoe inwardly projecting ears 101 are connected by links 46b with the arms 45b of the oscillatory ring. This construction is somewhat less expensive than that disclosed in the other views but the brake pressure will not be as uniformly applied throughout the length of each brake shoe but will be applied at the ends which are connected with the links 46b. In this construction the body of the brake shoe operates as a lever to apply the pressure to the seating portion. It will also be observed that the housing members 17b and 18b are formed to present cylindrical seating surfaces and the brake shoes have the form of arcuate bands instead of the cone formation shown in Figures 1 to 4. These features are of course applicable to the structure shown in Figures 1 to 4 if desired.

I claim:

1. A wheel having spaced web portions marginally connected and forming a housing providing internally a braking surface to be contacted by a brake shoe, a brake shoe mounted within the housing, a relatively fixed support also therein, a lever fulcrumed to said support and pivotally connected with said shoe, and an oscillatory member in toggle link connection with said lever and adapted, when actuated in one direction, to utilize the lever for pressing the brake shoe against said seating.

2. A wheel comprising the combination with a hub, of a radially extending housing supported from the hub and having walls which converge in a zone intermediate of the hub and their outer margins, the outer marginal portions extending radially in contact with each other and secured together, an annular set of brake shoes mounted within the housing and provided with surfaces substantially parallel with and adapted to seat against the converging wall portions of the housing, a relatively stationary axle, a ring keyed thereto and provided with outwardly extending spider arms each in supporting relation to one of the brake shoes, another ring mounted to oscillate upon the first mentioned ring and provided with arms in toggle link connection with the brake shoes and adapted to press them outwardly when the ring is oscillated in one direction, and means for oscillating said ring from a point exterior to the wheel.

3. A wheel comprising the combination with a hub, of a radially extending housing supported from the hub and having walls which converge in a zone intermediate of the hub and their outer margins, the outer marginal portions extending radially in contact with each other and secured together, an annular set of brake shoes mounted within the housing and provided with surfaces substantially parallel with and adapted to seat against the converging wall portions of the housing, a relatively stationary axle for the hub, a ring keyed thereto and provided with outwardly extending spider arms each in supporting relation to one of the brake shoes, another ring mounted to oscillate upon the first mentioned ring and provided with arms in toggle link connection with the brake shoes and adapted to press them outwardly when the ring is oscillated in one direction, and means for oscillating said ring from a point exterior to the wheel, said means comprising a shaft journaled within the axle and provided with an internal arm linked to said oscillatory ring and also having an external actuating arm.

4. The combination of a wheel having an internal brake, and angularly disposed seating surfaces for the brake of a supporting axle having an internal oscillatory shaft provided with an external operating arm, means for supporting the brake from the axle in seating relation to the wheel on opposite sides of the central plane thereof, and means for actuating the brake into brake setting relation to the wheel from said oscillatory shaft.

5. The combination of a hollow wheel structure provided with walls converging to form an internal brake seating with angularly disposed surfaces, a non-rotatable supporting axle, an oscillatory shaft journaled therein with one end projecting therefrom, and a brake within the wheel operatively connected with the other end of said shaft and supported in operative relation to said seating.

6. The combination with a wheel supporting axle, of a hollow wheel having a hub journaled on the axle and provided with an annular internal seating on each side of the central plane of the wheel, an oscillatory shaft extending through the axle and projecting beyond the ends thereof, a brake shoe mounted within the wheel in operative relation to said seating, and a brake operating arm on the oscillatory shaft extending radially about one end of the axle and of the hub within the hollow of the wheel and operatively connected with the brake shoe.

7. The combination with a wheel supporting axle, of a hollow wheel having a hub journaled on the axle, an oscillatory shaft extending through the axle and projecting beyond the ends thereof, a brake shoe mounted within the wheel, and a brake operating arm on the oscillatory shaft extending radially about one end of the axle and of the hub within the hollow of the wheel and operatively connected with the brake shoe, said wheel having internal divergent conical seatings and the brake shoe having corresponding seating faces.

8. A double webbed wheel in which the webs axially converge and having one of its webs provided with a hub and the other extending over the outer end of the hub and provided with a central detachable cap, in combination with a brake mechanism operative between said webs upon the interior surfaces thereof, and actuating connections extending through the hub and radially between the cap and the outer end of the hub for operating the brake mechanism.

9. The combination with a double webbed wheel in which the webs axially converge and having inner portions spaced to provide a brake receiving cavity, a hub connected with one of the webs, the other web having a detachable cap covering the outer end of the hub and spaced therefrom, an annular set of brake shoes within said cavity in resilient tension connection with each other, a tubular supporting axle for the hub, a ring secured to the axle and provided with supporting arms for the brake shoes, an oscillatory ring loosely mounted on the first mentioned ring and provided with toggle connections for moving the brake shoes radially into contact with the interior surfaces of the wheel webs when the ring is oscillated in one direction, and ring actuating connections extending through the axle and radially between the end thereof and said cap.

10. The combination with a double webbed wheel having inner portions spaced and converging to provide a brake receiving cavity, a hub connected with one of the webs, the other web having a detachable cap covering the outer end of the hub and spaced therefrom, an annular set of brake shoes within said cavity in resilient tension connection with each other, a tubular supporting axle for the hub, a ring secured to the axle and provided with supporting arms for the brake shoes, an oscillatory ring loosely mounted on the first mentioned ring and provided with toggle connections for moving the brake shoes radially into contact with the interior surfaces of the wheel webs when the ring is oscillated in one direction, and ring actuating connections extending through the axle and radially between the end thereof and said cap, said actuating connections being linked to the oscillatory ring and said oscillatory ring being sufficiently loose in its mountings to permit an equalization of the pressures upon the brake shoes.

11. In a wheel structure provided with an annular brake receiving cavity, the combination with the walls of said cavity, of an annular set of brake shoes in resilient tension connection with each other, means for supporting said shoes in a position for seating against the walls of the cavity when moved radially, relatively stationary means for supporting said shoes, and an oscillatory ring having radial arms in toggle link connection with the shoes to move them radially into seating position when the ring is actuated in one direction.

12. In a wheel structure provided with an annular brake receiving cavity, the combination with the walls of said cavity, of an annular set of brake shoes in resilient tension connection with each other, means for supporting said shoes in a position for seating against the walls of the cavity when moved radially, relatively stationary means for supporting said shoes, and an oscillatory ring having radial arms in toggle link connection with the shoes to move them radially into seating position when the ring is actuated in one direction, and means for oscillating said ring, extending through the axle and radially to the ring over one end of the axle.

13. In a wheel structure the combination of a supporting axle, a hub journaled thereon, a ring keyed to the supporting axle and provided with radial arms extending outwardly past one end of the hub, an oscillatory ring loosely mounted on the first mentioned ring and also provided with radial arms, levers fulcrumed to the first mentioned radial arms and linked to those of the oscillatory ring, an annular set of brake shoes, each carried by one of the levers, wheel webs enclosing said brake shoes and rings and provided with internal seating faces for the brake shoes, and means extending through the axle for operating the oscillatory ring.

14. In a wheel structure the combination of a supporting axle, a hub journaled thereon, a ring keyed to the supporting axle and provided with radial arms extending outwardly past one end of the hub, an oscillatory ring loosely mounted on the first mentioned ring and also provided with radial arms, levers fulcrumed to the first mentioned radial arms and linked to those of the oscillatory ring, an annular set of brake shoes, each carried by one of the levers, wheel webs enclosing said brake shoes and rings and provided with internal converging seating faces for the brake shoes, and means extending through the axle for operating the oscillatory ring, one of said wheel webs being provided with a detachable cap adapted, when removed, to permit access to the brake shoes, rings, and operating connections for removal or repair purposes.

15. In a wheel structure the combination of an axle member provided with a brake supporting ring splined to its outer end, a brake operating ring loosely mounted on the brake supporting ring, a retaining nut screwed to the end of the axle in retaining relation to both rings, an oscillatory shaft extending through the axle and provided with a detachable arm operatively linked to the loose ring to actuate the same, a wheel having converging walls formed to enclose said rings and operating connections and provided with a removable cap to permit removal and replacement of the detachable arm, retaining nut, and rings, and a set of brake shoes mounted within the wheel, each shoe being detachably supported from the splined ring and also having detachable connection with the oscillatory ring, said last mentioned connections being adapted to move the brake shoes to seating position against the interior of the walls when the ring is oscillated in one direction.

16. In a wheel structure the combination of an annular set of brake shoes having their ends spaced and in resilient tension connection with each other, levers, each pivotally connected with the central portion of one of the shoes, a non-rotatable ring having arms in fulcrum connection with one end of each lever, and an oscillatory ring loosely mounted upon the first mentioned ring and having arms in toggle link connection with the other ends of said levers, whereby movement of the oscillatory ring in one direction will press the brake shoe outwardly along radial lines and with equal pressure at all points in their seating surfaces.

17. The combination with a wheel having internal brake mechanism, of a wheel supporting axle, a driving axle extending therethrough and operatively connected with the wheel, a supporting tubular axle bar eccentric to the supporting axle and enclosing a portion of the driving axle, and a brake operating member extending through the wheel supporting axle at one side of the driving axle and supporting axle bar and operatively connected with the internal brake mechanism.

18. The combination with a wheel having internal brake mechanism, of a supporting axle for the wheel provided with a relatively fixed ring within the wheel in supporting relation to the brake mechanism, an oscillatory ring loosely supported from the axle and operatively connected with the brake mechanism, and a retaining nut for holding both rings in place.

19. A vehicle wheel provided with a tubular supporting axle and a driving shaft extending therethrough and operatively connected with the wheel, wheel braking devices wholly enclosed within the wheel and brake operating mechanism extending from an exterior point through the tubular axle and at one side of the driving axle.

20. A vehicle wheel having internal angularly disposed annular seatings on opposite sides of its central plane, brakes associated with said seatings, actuating means exterior to the wheel and connections between the actuating means and the brakes.

21. A vehicle wheel structure comprising the combination of a supporting axle, a driving axle extended therethrough, a wheel mounted for rotation upon the supporting axle and connected with the driving axle, a brake within the wheel and brake operating connections extending through the supporting axle eccentric to the driving axle.

22. A wheel provided with an internal brake seating with substantially equal and opposite axial pressure at opposite sides of the central plane of the wheel.

23. A traction wheel having a supporting axle and a driving axle extended therethrough in combination with an internal brake, brake setting connections housed within the wheel, and an oscillatory actuator extending through the supportig axle eccentric to the driving axle to actuate the brake setting connections.

GUSTAV E. STRANDT.